United States Patent [19]

Noack

[11] 4,022,711

[45] May 10, 1977

[54] CATALYZED HYDRAZINE COMPOUND CORROSION INHIBITING COMPOSITION CONTAINING A COMPLEX OF METAL SALT AND AMINO DERIVATIVE OF CARBOXYLIC ACID, AND A QUINONE COMPOUND

[75] Inventor: Manfred G. Noack, Northford, Conn.

[73] Assignee: Olin Corporation, New Haven, Conn.

[22] Filed: Feb. 24, 1976

[21] Appl. No.: 660,807

[52] U.S. Cl. .................... 252/389 R; 21/2.5 R; 21/2.7 R; 106/14; 210/63 R; 252/8.55 E; 252/181; 252/184; 252/188; 252/392; 252/393

[51] Int. Cl.² .................. C23F 11/14; C23F 11/18

[58] Field of Search ............ 252/389 R, 184, 392, 252/393, 181, 188, 8.55 E; 21/2.7 R, 2.5 R; 106/14; 210/63

[56] References Cited

UNITED STATES PATENTS

| | | | |
|---|---|---|---|
| 3,728,281 | 4/1973 | Marks et al. | 252/392 |
| 3,843,547 | 10/1974 | Kaufman et al. | 252/392 |

Primary Examiner—Edward A. Miller
Assistant Examiner—Irwin Gluck
Attorney, Agent, or Firm—William A. Simons

[57] ABSTRACT

Corrosion inhibiting compositions are described which contain a hydrazine compound, an organometallic complex and a quinone compound. The organometallic complex is the reaction product of a cobaltous, manganous, or cupric inorganic salt and one or more ligands comprising amino derivatives of carboxylic acids or salts. The quinone compound is one which renders the composition compatible with chelating phosphonate scale control agents. The use of these compositions as oxygen scavengers in corrosive environments is also described.

32 Claims, No Drawings

CATALYZED HYDRAZINE COMPOUND CORROSION INHIBITING COMPOSITION CONTAINING A COMPLEX OF METAL SALT AND AMINO DERIVATIVE OF CARBOXYLIC ACID, AND A QUINONE COMPOUND

The present invention is directed to catalyzed hydrazine compound corrosion inhibiting compositions and their use in corrosive environments. More particularly the present invention is directed to compositions comprising a hydrazine compound, a catalytic organometallic complex which enhances oxygen scavenging and a quinone compound which renders the composition compatible with chelating phosphonate scale control agents. The present invention is further directed to the use of these compositions to inhibit or reduce corrosion.

It is well known to use hydrazine compounds for the removal of oxygen from gases and liquids to retard the corrosion of metal surfaces. Among the more important commercial uses of hydrazine compounds for this purpose are in water and steam apparatus such as boilers, hot water heating systems and water cooling systems. These hydrazine compounds are also used in inorganic and organic fluid heat exchange systems, e.g., alkylene glycol coolant systems. It is believed that the hydrazine compound reacts in the system so that hydrogen from the hydrazine compound combines with the oxygen to form water or other compound so as to bind up the oxygen and thereby inhibit corrosion.

The rate of reaction of a hydrazine compound, e.g., hydrazine, monomethyl hydrazine or the like, with oxygen at ambient temperatures or lower, is relatively slow. As a result, numerous suggestions have been made in the art to add catalytic or accelerating agents to the hydrazine compound to facilitate oxygen removal or scavenging in fluidic corrosive environments. Thus, it has been suggested that various catalysts be employed in conjunction with the hydrazine compound such as is described, for example, in U.S. Pat. Nos. 3,551,349 to Kallfass, 3,728,281 to Marks et al, 3,808,138 to Yamaguchi et al, and 3,843,547 to Kaufman et al.

It has now been discovered that certain compounds when used in combination with a hydrazine compound in corrosive environments significantly increase the rate of reaction of the hydrazine compound in removing oxygen and this is so to a surprisingly significant degree even at ambient or lower temperatures. The organometallic complexes used in the compositions which comprise the present invention have not heretofore been taught or suggested in the prior art literature including the above-mentioned patents and yet they are high performers as hydrazine compound oxygen scavenging catalysts. It has further been discovered that the compositions of the present invention are rendered compatible with commercially used chelating phosphonate scale control agents by the inclusion of a quinone compound therein.

The novel compositions of the present invention contain a hydrazine compound, a catalytic organometallic complex and a quinone compound, as mentioned. The hydrazine compound employed in the compositions of the present invention may be hydrazine itself or it may be any of the hydrazine compounds which function as oxygen scavengers in fluidic corrosive environments. Thus, hydrazine compounds such as methylhydrazine, ethylhydrazine, propylhydrazine, butylhydrazine, 1,1-dimethylhydrazine, 1,1-dibutylhydrazine, and higher alkylated hydrazine compounds, hydroxy alkyl hydrazines, for example, hydroxyethyl hydrazine, as well as aromatic and aralkyl hydrazine compounds, may be employed. The hydrazine compound may be any of these or a mixture of these and may be used in anhydrous form or in an aqueous solution. The aqueous solution is, of course, the more preferred form when the composition is to be used in water-based corrosive environments. When organic fluid environments are involved the hydrazine compound may be used in an organic solution, e.g., in a lower alkylene glycol solution. In addition to the hydrazine compound mentioned, the inorganic and/or organic hydrazine compound salts may be employed to replace part or all of the hydrazine compound wherever compatible with the fluidic system. Suitable inorganic hydrazine compounds which may be used include hydrazine phosphate, hydrazine monohydrochloride and dihydrochloride, hydrazine monohydrobromide and dihydrobromide, monohydrosulfate and dihydrosulfate, and the like.

When the hydrazine compound is employed in combination with an inorganic or organic solution, any workable solvent may be used as long as the solvent is compatible with the fluidic corrosive environment which is to be treated. There is no criticality in the amount of solvent employed because the solvent will be compatible with and may become part of the system which is to be treated. However, as a practical matter, regardless of the solvent chosen, generally at least about 1 mole to about 100 moles, and preferably about 1.5 moles to about 10 moles, and preferably about 1.5 moles to about 10 moles of the solvent is used per mole of hydrazine compound. The exact amount may be somewhat influenced by the particular hydrazine compound chosen or simply may be dictated by the commercial availability of particular solution. For example, when an aqueous solution is used the solution may contain about 5 to about 64 percent hydrazine compound by weight, based on the total weight of the water and the hydrazine compound. When an organic solution is used, it may contain about 5 to about 40 percent by weight of hydrazine compound, for example, based on the total weight of the organic solvent and the hydrazine compound.

The organometallic complex in the compositions of the present invention are reaction products of an inorganic salt and an organic ligand. Specifically, the inorganic salt is one of cobalt, manganese, or copper. The inorganic salt is represented by the formula:

$$MX_{(2/n)} \qquad (1)$$

wherein M is cobaltous, manganous, or cupric metal ion, X is an inorganic anion, and $n$ is the charge of the anion. Thus, the inorganic salt is one of cobalt, manganese, or copper in combination with two uninegative or one dinegative anion such as, for example, $NO_3^-$, $Cl^-$, $Br^-$, $I^-$, or $SO_4^{--}$. The inorganic salt may be used in the form of an aqueous solution or in its crystalline forms as desired. Preferred inorganic salts are the cobaltous and manganous salts.

In order to form the organometallic complex used in the composition of the present invention, the inorganic salt is reacted with one or more organic ligands selected from the group consisting of unsubstituted and inertly substituted amino derivatives of carboxylic acids and salts thereof. These organic ligands are aliphatic or aromatic compounds which may have only one amino group or may have two or more amino groups, as more fully described. The inert substituents which may be part of the organic ligand include any which do not interfere with the formation of the organometallic complexes and with the oxygen scavenger accelerating function of the compositions of the present invention and will include alkyl, aralkyl, alkaryl, and aryl groups, e.g., having about 1 to about 14 and preferably about 1 to about 7 carbon atoms, as well as inorganic substituents such as the sulfonic acid radical and the like. On the organic ligand is the required amino radical or radicals and the inert substituents may be located in any of the positions not occupied by the aforesaid amino radical or radicals.

The organic ligands which may be used in forming the organometallic complexes used in the composition of the present invention include those having the general formula:

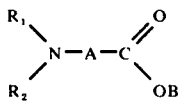
(II)

wherein A is a branched or straight chain alkylene biradical having about 1 to about 10 carbon atoms; B is hydrogen or any suitable cation, e.g., metal ion or ammonium or hydrazinium, which is capable of being replaced by cobaltous, manganous, or cupric ion; and $R_1$ and $R_2$ are each independently selected from the group consisting of hydrogen, lower alkyls, aryls, the radical:

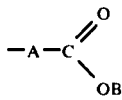
(III)

wherein A and B are defined above, and the radical:

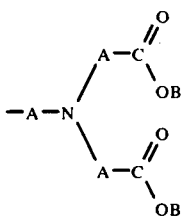
(IV)

wherein each A and B are independently selected from the groups defined for A and B above, respectively.

Desirably the ligand used in preparing the compound of the present invention is one having the structure of Formula (II) above wherein A has 1 to 4 carbon atoms, $R_1$ and $R_2$ are each independently selected from the group consisting of hydrogen, alkyls having 1 to 10 carbon atoms, aryls having 6 to 14 carbon atoms and the radicals of Formulas (III) and (IV) above wherein A has 1 to 4 carbon atoms. Preferably, the ligand is one having the structure of Formula (II) above wherein A has 1 to 3 carbon atoms and $R_1$ and $R_2$ are each independently selected from the group consisting of hydrogen, alkyls having 1 to 4 carbon atoms and the radicals of Formulas (III) and (IV) above wherein A has 1 to 3 carbon atoms.

Exemplary of the most preferred ligands are glycine and its salts, having the formula:

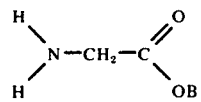
(V)

nitrilotriacetic acid (NTA) and salts, having the formula:

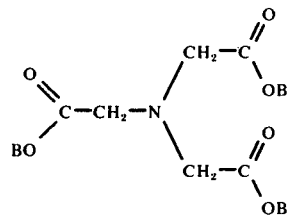
(VI)

and ethylenediamine tetraacetic acid (EDTA) and salts, having the formula:

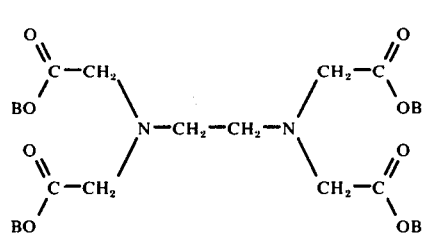
(VII)

wherein B for each of Formulas (V) through (VII) is as defined above, and especially wherein B is hydrogen.

Further, in addition to, but less desirably than the compounds represented by the foregoing, the organic ligands which may be used in forming the organometallic complexes used in the composition of the present invention also include those having the general formula:

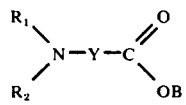
(VIII)

wherein B, R, and $R_2$ are as defined above, and wherein Y is a substituted or unsubstituted ortho arylene biradical.

Of the compounds represented by Formula (VIII) above, desirably Y is an ortho phenylene or toluene or naphthalene biradical, and $R_1$ and $R_2$ are each independently selected from the group consisting of hydrogen, alkyls having 1 to 10 carbon atoms, aryls having 6 to 14 carbon atoms and the radicals of Formulas (III) and (IV) above wherein A has 1 to 4 carbon atoms. Of the compounds represented by Formula (VIII) above, preferred are those wherein Y is an ortho phenylene or toluene or naphthalene radical, and $R_1$ and $R_2$ are each independently selected from the group consisting of hydrogen, alkyls having 1 to 4 carbon atoms, and the radicals of Formula (III) and (IV) wherein A has 1 to 3 carbon atoms.

Exemplary of the compounds represented by Formula (VIII) are the following:

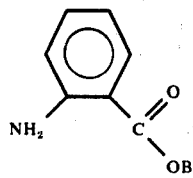
(IX)

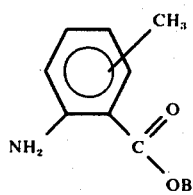
(X)

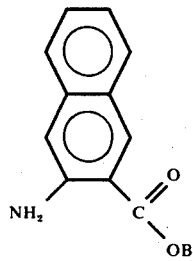
(XI)

The organic ligand may effectively be employed in an aqueous or organic solvent solution. The amount of water or other solvent used for the inorganic salt and the amount of water or organic solvent used for the organic ligand will depend upon the compatibility of the particular inorganic salt, organic ligand, and solvents selected. However, in general about 5 to about 50 moles, and preferably about 20 to about 30 moles, of water or other appropriate solvent may be used per mole of inorganic salt. About 5 to about 40 moles and preferably about 20 to about 30 moles of water or organic solvent may be used in combination with the organic ligand. Among the preferred solvents for the organic ligand are water, and the lower alkylates, such as ethanol and methanol, and the like.

In forming the organometallic complexes, the inorganic salt as represented by Formula (I) above is reacted with one or more of the organic ligands represented by Formulas (II) to (XI) above so that about 0.1 to about 10 or even more moles, and preferably about 1 to about 4 moles of ligand is used per gram-atom of metal ion. These two components may advantageously be combined and reacted at room temperature and at atmospheric pressure. However, lower or higher temperatures and negative or positive pressures may be employed if desired. Thus, temperatures ranging from about 10 to about 100° C and preferably about 20° to about 50° C, and pressures as low as 5 psi up to about 30 psi, and preferably within the range of about 10 to about 15 psi, may be used. At any rate, it can be seen that any combination of temperature and pressure may be used in preparing the organometallic complex provided that there is no significant detrimental effect on the reaction or on the desired products.

The reaction of the inorganic salt and the organic ligand generally occurs in a very short period of time, e.g., instantaneously, and a significant amount of organometallic complex is obtained within a matter of seconds. The organometallic complex may be dissolved in the reaction mixture or it may precipitate out of the reaction mixture. Regardless of the particular form of the organometallic complex, the complex is compatible with the reaction mixture and may be stored therein for an indefinite period of time. Because the reaction occurs in most cases somewhat instantaneously, and because the desired product may be stored in the reaction mixture, there is no criticality to the residence time involved in the reaction between the inorganic salts and the organic ligands used in the present invention. However, if desired, the organometallic complex may be separated from the reaction mixture by any conventional means, e.g., by filtration or by distillation of the solvent. Alternatively, the organometallic compound need not be separated from the reaction mixture and the entire entity may be used as a component for the composition of the present invention.

The quinone compound which is used in the composition of the present invention may be any quinone compound which renders the composition compatible with known chelating phosphonate scale controlagents. Among the quinone compounds which may be used are the para-quinones, para-hydroquinones, para-naphthaquinones, para-anthraquinones, and the like, as well as their substituted derivatives. These include alkyl and aryl substituted quinones as well as those having hydrophilic substituents. Among the desired quinone compounds which may be used are the alkylated and arylated para-quinones and para-hydroquinones having about 1 to about 10 carbon atoms in the substituent, and those having substituent derivatives from carboxylic acids, sulfonic acid, carboxylic acid alkali metal salt, sulfonic acid alkali metal salt and nitro. Preferred are the lower alkyl para-quinones and para-hydroquinones having 1 to 5 carbon atoms in the alkyl substituent.

The organometallic complex described above and the quinone compound are combined with the hydrazine compound to form a composition of the present invention. In general, about 0.002 parts to about 0.04 parts by weight of an organometallic complex is combined with one part by weight of the hydrazine compound. Preferably at least about 0.005 parts to about 0.02 parts by weight of the organometallic complex is used per part of hydrazine compound in the composition of the present invention. In general, about 0.001 parts to about 0.05 parts by weight of a quinone compound is combined with one part by weight of hydrazine compound. Preferably at least about 0.005 to about 0.02 parts by weight of the quinone compound per part by weight of hydrazine compound is used.

The organometallic complex, the quinone compound and the hydrazine compound may be combined prior to use of the resulting composition as a corrosion inhibitor, or the three components may be combined in any combination, e.g., by adding each of them separately to the fluid in the system to be treated. When an aqueous solution of the hydrazine compound is used, and this is particularly preferable for treating water containing systems, about 5 to about 64 percent by weight of the hydrazine compound and preferably about 10 to about 40 percent of the hydrazine compound may be used. This is desirably used in combination with about 0.05 to about 5 percent and preferably about 0.2 to about 2 percent of the organometallic complex, and with about 0.005 to about 3.2 percent and preferably about 0.05 to about 0.40 percent of the quinone compound, by weight, the remainder being water.

As alternatives to combining the organometallic complex and the quinone compound with the hydrazine compound either before or after being added to the fluidic corrosive environment to be treated, other approaches may advantageously be used. In one preferred embodiment, the organic ligand may be dissolved in a hydrazine compound solution and the inorganic salt either in solid or solution form may subsequently be combined with the organic ligand-hydrazine compound solution, either before or after the organic ligand-hydrazine compound solution is added to the fluid system to be treated, and the guinone compound may be added at any step. In another preferred embodiment of the present invention, the inorganic salt may first be dissolved in a hydrazine compound solution and then the organic ligand may be combined therewith either before or after the inorganic salt-hydrazine compound solution is added to the fluidic system to be treated and the quinone compound may be added to any component at any step. In yet another preferred embodiment, the hydrazine compound, the organic ligand and the inorganic salt, and the quinone compound may each independently be added to the fluidic corrosive environment to be treated. It should be noted that in those embodiments wherein the inorganic salt and the organic ligand are not combined until added to the fluidic system to be treated, the organometallic complex is formed in situ. It should also be noted that regardless of the particular combining approach taken the relative amount of hydrazine compound, of organic ligand and inorganic salt, and of quinone compound used are those set forth above.

In the method of the present invention, the compositions are used to inhibit oxygen corrosion in fluidic corrosive environments, as mentioned. The compositions are generally combined with the system to be treated so that at least about a stoichiometric amount of hydrazine compound is present based on the amount of dissolved oxygen in the system. Typically, this may mean that the composition is used so that the hydrazine compound concentration in the fluidic system, after admixing, but before reaction with the dissolved oxygen takes place, is in the range of about 0.001 to about 1,000 ppm, e.g., about 0.01 to about 400 ppm. The particular method used in combining the corrosion inhibiting compositions of the present invention may be any of those which have been previously described and the physical techniques of addition may be any of those which are well known in the art with respect to the use of hydrazine as an oxygen scavenger. Likewise, the methods of determining the amount of oxygen present in a fluidic system are well known in the art and need not be described herein.

The following examples of the present invention are presented for illustrative purposes only, and the present invention should not be construed to be limited thereto.

EXAMPLE 1

Preparation of Catalyzed Hydrazine Solution

A hydrazine solution containing 0.6% by weight of cobalt complex of ethylene diaminetetraacetic acid is prepared by mixing 1.6 grams of disodium ethylene diamine tetraacetic acid dihydrate dissolved in 112 ml deionized water with 132 ml of hydrazine hydrate and adding subsequently 5.23 ml of an aqueous solution containing 20% $CoCl_2 \cdot 6H_2O$. An activated hydrazine solution in accordance with this invention is prepared by dissolving 2.3 milligrams of methyl hydroquinone per milliliter of hydrazine solution containing 0.6 weight percent of cobalt EDTA catalysts.

EXAMPLE 2

Determination of Catalytic Activity in Presence and Absence of Chelating Scale Control Chemicals The rate of chemical oxygen removal with activated hydrazine and hydrazine without added catalyst is subsequently determined by the following procedure.

Air-saturated test solutions of pH 10.0 and dissolved oxygen concentration approximately 8 ppm are prepared in Erlenmeyer flasks of approximately 1055 ml capacity by dissolving sodium carbonate and bicarbonate until pH 10.0 is obtained. Commercially available scale control agents are subsequently added in the concentrations shown in Table I to all but two of the flasks. Before measurements are carried out, each flask is heated or cooled as required to bring the solution contained therein to 25.0° C. After fitting a flask readied for measurements as described with a selective membrane electrode for purposes of measuring dissolved oxygen concentration by means of commercial oxygen meter, one injects hydrazine in quantity sufficient to bring its concentration to 150 ppm before reaction with oxygen occurs. The stirred flask is then immediately sealed and oxygen concentration recorded as function of time. Each test is repeated with hydrazine solution prepared in accordance with Example 1. The results shown in Table I demonstrate the catalytic activity of the catalyst system in accordance with this invention.

EXAMPLE 3

A solution of 1.187 g trisodium nitrilotriacetate monohydrate in 112 ml distilled water is combined with 132 ml hydrazine hydrate and with 5.23 ml of a 20% solution of $CoCl_2 \cdot 6H_2O$ in water. A quantity of 58.5 milligrams of methylhydroquinone is subsequently dissolved in this solution.

EXAMPLE 4

Following the procedure described in Example 3, 0.389 g disodium ethylenediamine tetraacetate monohyrate is added to 26.3 ml distilled water and 33 ml hydrazine hydrate, 1.27 ml of a 12.3% solution of manganous sulfate, and 0.138 g methylhydroquinone, are added thereto.

EXAMPLE 5

A solution is prepared in accordance with Example 1 except that 2.3 milligrams of hydroquinone instead of methylhydroquinone are added for each milliliter of Co-EDTA solution in 35% hydrazine.

EXAMPLE 6

The rate of chemical oxygen removal in presence and absence of 2.0 ppm of nitrolotris(methylenephosphonic acid) scale control agent with solutions prepared in accordance with Examples 3 through 5 is measured as described in Example 2. The comparison with control experiments carried out with hydrazine not containing catalyst as shown in Table II demonstrates the effectiveness of chemical oxygen scavengers in accordance with this invention.

TABLE I

CHEMICAL OXYGEN REMOVAL IN PRESENCE AND ABSENCE OF COMMERCIAL SCALE CONTROL AGENTS

| Known Scale Control Agent | | Percent of Initial Dissolved $O_2$ Removed Within 1 Minute | |
|---|---|---|---|
| Formula or Name | Conc. (ppm) | Hydrazine Without Catalyst | Solution in Accordance with Ex. No. 1 |
| None | — | ~5 | >98 |
| $N(CH_2PO_3H_2)_3$ | 2.5 | <1 | >98 |
| HO—P(=O)(OH)—C(CH_3)(OH)—P(=O)(OH)—OH | 3.0 | >11 | >98 |
| $[(H_2O_3P)_2N-CH_2-]_2$ | 4.5 | 0 | >99 |
| $[(H_2O_3P)_2N-C_3H_6-]_2$ | 1.7* | >1 | >98 |
| Polyacrylonitrile partially hydrolyzed | 10 | >6 | >98 |
| $Na_3PO_4$ | 70 | >32 | >98 |
| Sodiumhexameta phosphate | 55 | >12 | >98 |
| NTA-trisodium salt | 15 | >2 | >99 |
| EDTA-disodium salt | 10 | <1 | >98 |

*added as a hexapotassium salt

TABLE II

CHEMICAL OXYGEN REMOVAL WITH CATALYZED HYDRAZINE SOLUTION

| Solution | Scale Control Agent NTP* (in ppm) | Percent of Initial Dissolved Oxygen Removed After | |
|---|---|---|---|
| | | 1 min. | 3 min. |
| Hydrazine without catalyst | None | 5 | 15 |
| Hydrazine without catalyst | 2 | 0.3 | 0.8 |
| Solution of Ex. 3 | None | 55 | 97 |
| Solution of Ex. 3 | 2 | 58 | 98 |
| Solution of Ex. 4 | None | 95 | 99 |
| Solution of Ex. 4 | 2 | 94 | 99 |
| Solution of Ex. 5 | None | 30 | 79 |
| Solution of Ex. 5 | 2 | 5 | 19 |

*NTP = nitrilotriphosphonate-based product

What is claimed is:

1. A composition, comprising:
   a. a hydrazine compound:
   b. about 0.002 parts to about 0.04 parts by weight of an organometallic complex per part of hydrazine compound, said organometallic complex being the reaction product of:
      i. an inorganic salt selected from the group consisting of cobaltous, manganous, and cupric salts; and
      ii. at least one organic ligand selected from the group consisting of unsubstituted amino derivatives of carboxylic acids, substituted amino derivatives of carboxylic acids wherein the substituents are inert and salts of said unsubstituted and substituted derivatives; and
   c. about 0.001 parts to about 0.05 parts by weight of a quinone compound per part of hydrazine compound.

2. The composition of claim 1 wherein said inorganic salt has the formula:

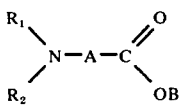

$$MX_{(2/n)} \qquad (I)$$

wherein M is a cobaltous or manganous metal ion, X is an inorganic anion, and $n$ is the charge of the anion.

3. The composition of claim 1 wherein said hydrazine compound is in anhydrous form.

4. The composition of claim 1 wherein said hydrazine compound is in an aqueous solution containing about 5 to about 64 percent hydrazine compound by weight, based on the total weight of the water and the hydrazine compound.

5. The composition of claim 1 wherein about 0.005 parts to about 0.02 parts by weight of the organometallic complex is used per part of hydrazine compound.

6. The composition of claim 5 wherein said organometallic complex is the reaction product of an inorganic salt as recited, and one or more ligands having one of the formulas:

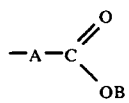

(II)

wherein A is a branched or straight chain alkylene biradical having about 1 to about 10 carbon atoms; B is hydrogen or any suitable cation which is capable of being replaced by cobaltous, manganous, or cupric ion; and $R_1$ and $R_2$ are each independently selected from the group consisting of hydrogen, lower alkyls, aryls, the radical:

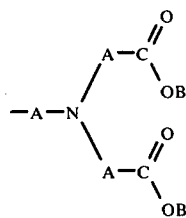

(III)

wherein A and B are defined above, and the radical:

(IV)

wherein each A and B are independently selected for the groups defined for A and B respectively; and

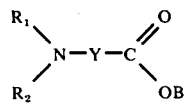

(VIII)

wherein Y is a substituted or unsubstituted ortho arylene biradical; and
wherein B, $R_1$ and $R_2$ are as defined above.

7. The composition of claim 1 wherein about 0.005 parts to about 0.02 parts by weight of the quinone compound is used per part of hydrazine compound.

8. The composition of claim 7 wherein the quinone compound is para-quinone, a para-hydroquinone, a para-naphthoquinone, a para-anthraquinone or a substituted derivative thereof.

9. The composition of claim 8 wherein said hydrazine compound is in an organic solvent solution containing about 5 to about 40 percent hydrazine compound by weight, based on the total weight of the organic solvent and the hydrazine compound.

10. The composition of claim 8 wherein said organometallic complex is the reaction product of an inorganic salt as recited, and one or more ligands represented by Formula (II) above.

11. The composition of claim 10 wherein the ligand is one having the structure of Formula (II) above wherein A has 1 to 3 carbon atoms, and $R_1$ and $R_2$ are each independently selected from the group consisting of hydrogen, alkyls having 1 to 4 carbon atoms and the radicals of Formulas (III) and (IV) above wherein A has 1 to 3 carbon atoms and wherein the quinone compound is a lower alkyl para-quinone or a lower alkyl para-hydroquinone.

12. The composition of claim 1 wherein the organic ligand for said organometallic complex is selected from the group consisting of glycine, nitrilotriacetic acid, ethylene diamine tetraacetic acid, and their salts and wherein the quinone compound is methyl hydroquinone.

13. A method of treating a fluidic corrosive environment to remove oxygen therefrom and inhibit corrosion therein, which comprises:

treating said environment with a composition comprising:
 a. a hydrazine compound;
 b. about 0.002 parts to about 0.04 parts by weight of an organometallic complex per part of hydrazine compound, said organometallic complex being the reaction product of:
  i. an inorganic salt selected from the group consisting of cobaltous, manganous, and cupric salts; and
  ii. at least one organic ligand selected from the group consisting of unsubstituted amino derivatives of carboxylic acids, substituted amino derivatives of carboxylic acids wherein the substituents are inert and salts of said unsubstituted and substituted derivatives; and
 c. about 0.001 parts to about 0.05 parts by weight of a quinone compound per part of hydrazine compound.

14. The method of claim 12 wherein said inorganic salt has the formula:

      (I)

$$MX_{(z/n)}$$

wherein M is a cobaltous, manganous, or cupric metal ion, X is an inorganic anion, and $n$ is the charge of the anion.

15. The method of claim 14 wherein said hydrazine compound is in anhydrous form.

16. The method of claim 13 wherein said hydrazine compound is in an aqueous solution containing about 5 to about 64 percent hydrazine compound by weight, based on the total weight of the water and the hydrazine compound.

17. The method of claim 13 wherein about 0.005 parts to about 0.02 parts by weight of the organometallic complex is used per part of hydrazine compound.

18. The method of claim 17 wherein said organometallic complex is the reaction product of an inorganic salt as recited, and one or more ligands having the formula:

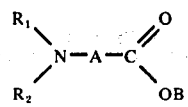

wherein A is a branched or straight chain alkylene biradical having about 1 to about 10 carbon atoms; B is hydrogen or any suitable cation which is capable of being replaced by cobaltous, manganous, or cupric ion; and $R_1$ and $R_2$ are each independently selected from the group consisting of hydrogen, lower alkyls, aryls, the radical:

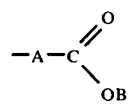

wherein A and B are as defined above, and the radical:

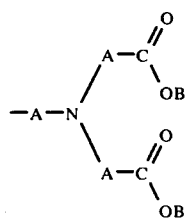

wherein each A and B are independently selected for the groups defined for A and B respectively; and

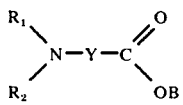

wherein Y is a substituted or unsubstituted ortho arylene biradical, and
wherein B, $R_1$ and $R_2$ are as defined above.

19. The method of claim 18 wherein said hydrazine compound is in an organic solvent solution containing about 5 to about 40 percent hydrazine compound by weight, based on the total weight of the organic solvent and the hydrazine compound.

20. The method of claim 18 wherein said organometallic complex is the reaction product of an inorganic salt as recited, and one or more ligands represented by Formulas (II) above.

21. The method of claim 20 wherein the ligand is one having the structure of Formula (II) above wherein A has 1 to 3 carbon atoms, and $R_1$ and $R_2$ are each independently selected from the group consisting of hydrogen, alkyls having 1 to 4 carbon atoms and the radicals of Formulas (III) and (IV) above wherein A has 1 to 3 carbon atoms and wherein the quinone compound is a lower alkyl para-quinone or a lower alkyl para-hydroquinone.

22. The method of claim 13 wherein the organic ligand for said organometallic complex is selected from the group consisting of glycine, nitrilotriacetic acid, ethylene diamine tetraacetic acid, and their salts and wherein the quinone compound is methyl hydroquinone.

23. The method of treating a fluidic corrosive environment to remove oxygen therefrom and inhibit corrosion therein, which comprises:

adding the following components to said environment:
- a. a hydrazine compound in at least about a stoichiometric amount, based on the amount of oxygen to be removed;
- b. an inorganic salt having the formula:

$$MX_{(2/n)} \qquad (1)$$

wherein M is a cobaltous, manganous, or cupric metal ion, X is an inorganic ion, and $n$ is the charge of the ion;
- c. at least one organic ligand selected from the group consisting of unsubstituted amino derivatives of carboxylic acids, substituted amino derivatives of carboxylic acids wherein the substituents are inert and salts of said unsubstituted and substituted derivatives, and wherein about 0.1 to about 10 moles of ligand are used per gram-atom of metal ion and wherein from about 0.002 parts to about 0.04 parts by weight of total organic ligand and inorganic salt are used per part of said hydrazine compound; and
- d. about 0.001 parts to about 0.05 parts by weight of a quinone compound per part of hydrazine compound.

24. The method of claim 23 wherein each of said components are added separately to said environment.

25. The method of claim 23 wherein said organic ligand and said hydrazine compound are combined prior to being added to said environment.

26. The method of claim 23 wherein said inorganic salt and said hydrazine compound are combined prior to being added to said environment.

27. The method of claim 23 wherein said inorganic salt and said organic ligand are combined prior to being added to said environment.

28. The method of claim 23 wherein about 0.005 parts to about 0.02 parts by weight of total organic ligand and inorganic salt, and about 0.005 parts to about 0.02 parts by weight of quinone compound are used per part of said hydrazine compound.

29. The method of claim 28 wherein each of said components are added separately to said environment.

30. The method of claim 28 wherein said organic ligand and said hydrazine compound are combined prior to being added to said environment.

31. The method of claim 28 wherein said inorganic salt and said hydrazine compound are combined prior to being added to said environment.

32. The method of claim 28 wherein said inorganic salt and said organic ligand are combined prior to being added to said environment.

* * * * *

UNITED STATES PATENT OFFICE
CERTIFICATE OF CORRECTION

Patent No. 4,022,711     Dated May 10, 1977

Inventor(s) Manfred G. Noack

It is certified that error appears in the above-identified patent and that said Letters Patent are hereby corrected as shown below:

Column 2, line 34, after "10 moles" delete ", and preferably about 1.5".

Column 2, line 35, delete "moles to about 10 moles".

Column 2, line 48, after the word "complex" insert --used--.

Column 8, line 48, "monohyrate" should be spelled --monohydrate--.

Column 9, in Table I, the formula "$[(H_2O_3P)_2N-CH_2-]_2$" should read

--$[(H_2O_3P)_2N-CH_2-]_2$--.

Column 9, in Table I, the formula "$[(H_2O_3P)_2N-C_3H_6-]_2$" should read

--$[(H_2O_3P)_2N-C_3H_6-]_2$--.

Signed and Sealed this

*Twenty-ninth* Day of *November 1977*

[SEAL]

Attest:

RUTH C. MASON  
*Attesting Officer*

LUTRELLE F. PARKER  
*Acting Commissioner of Patents and Trademarks*